US010127254B2

(12) United States Patent
Chen et al.

(10) Patent No.: US 10,127,254 B2
(45) Date of Patent: Nov. 13, 2018

(54) METHOD OF INDEX RECOMMENDATION FOR NOSQL DATABASE

(71) Applicant: International Business Machines Corporation, Armonk, NY (US)

(72) Inventors: Hao Chen, Beijing (CN); Feng Li, Beijing (CN); Shao C. Li, Beijing (CN); Qi Cheng Li, Beijing (CN); Li Jun Mei, Beijing (CN); Fang Quan Xie, Fuzhou (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 422 days.

(21) Appl. No.: 14/869,493

(22) Filed: Sep. 29, 2015

(65) Prior Publication Data

US 2016/0125004 A1 May 5, 2016

(30) Foreign Application Priority Data

Oct. 30, 2014 (CN) .......................... 2014 1 0599318

(51) Int. Cl.
*G06F 17/30* (2006.01)

(52) U.S. Cl.
CPC .. *G06F 17/30321* (2013.01); *G06F 17/30011* (2013.01)

(58) Field of Classification Search
CPC ........ G06F 17/30011; G06F 17/30321; G06F 17/30333; G06F 17/30619; G06F 17/30864

(Continued)

(56) References Cited

U.S. PATENT DOCUMENTS 9,390,128 B1 * 7/2016 Seetala ............. G06F 17/30433
2009/0094236 A1   4/2009 Renkes et al.
(Continued)

FOREIGN PATENT DOCUMENTS

CN    102262640 A    11/2011
CN    102521282 A    6/2012
(Continued)

OTHER PUBLICATIONS

Ohene-Kwofie, D. et al., "O2-Tree: A Fast Memory Resident Index for NOSQL Data-Store," CSE '12 Proceedings of the 2012 IEEE 15th International Conference on Computational Science and Engineering, Dec. 2012, pp. 50-57.

(Continued)

*Primary Examiner* — Dennis Truong
(74) *Attorney, Agent, or Firm* — Zilka Kotab, P.C.

(57) ABSTRACT

In one embodiment, a method for indexing a document database includes determining, according to user's access status on a plurality of documents in the document database, index indicators from attributes of respective fields of the plurality of documents, wherein the index indicators are used for indexing the plurality of documents, dividing the plurality of documents into a plurality of document sets, indexing the plurality of document sets according to the index indicators. The method may include dividing a plurality of documents in a document database into document sets by utilizing an attribute that a document database is easy to be divided into chunks, and may effectively implement indexing of the document database for the document sets according to another embodiment.

18 Claims, 7 Drawing Sheets

(58) Field of Classification Search
USPC ............................................. 707/741
See application file for complete search history.

(56) References Cited

U.S. PATENT DOCUMENTS

| | | | |
|---|---|---|---|
| 2012/0096008 A1* | 4/2012 | Inouye | G06F 17/30333 |
| | | | 707/743 |
| 2013/0238584 A1 | 9/2013 | Hendry | |
| 2013/0332484 A1 | 12/2013 | Gajic | |
| 2013/0339366 A1* | 12/2013 | Khimich | G06F 17/30587 |
| | | | 707/741 |
| 2014/0108415 A1* | 4/2014 | Bulkowski | G06F 17/30545 |
| | | | 707/741 |
| 2014/0214897 A1 | 7/2014 | Zhu et al. | |
| 2014/0229427 A1 | 8/2014 | Bestgen et al. | |
| 2014/0279855 A1* | 9/2014 | Tan | G06F 17/30345 |
| | | | 707/609 |
| 2014/0337064 A1* | 11/2014 | Weissman | G06Q 30/0627 |
| | | | 705/5 |
| 2015/0019562 A1* | 1/2015 | Bulkowski | G06F 17/30545 |
| | | | 707/741 |
| 2015/0347547 A1* | 12/2015 | Kasheff | G06F 17/30575 |
| | | | 707/637 |
| 2016/0125004 A1* | 5/2016 | Chen | G06F 17/30321 |
| | | | 707/741 |
| 2016/0330180 A1* | 11/2016 | Egorov | G06F 21/6227 |

FOREIGN PATENT DOCUMENTS

| | | |
|---|---|---|
| CN | 102651007 A | 8/2012 |
| CN | 103198150 A | 7/2013 |

OTHER PUBLICATIONS

Anonymous, "Method and Apparatus for Autonomously handling Dynamic Indexes in Flexible Schema Documents for NoSQL Solutions," ip.com, Sep. 4, 2013, pp. 1-2.
MongoDB, May 28, 2015, pp. 1-2, Retrieved From https://www.mongodb.com/.
OrientDB, Aug. 30, 2015, pp. 1-2, Retrieved From http://orientdb.com/orientdb/.
CouchDB, Aug. 26, 2015, pp. 1-6, Retrieved From http://couchdb.apache.org/.
Google Code, Terrastore, Aug. 25, 2015, pp. 1-3, Retrieved From https://code.google.com/archive/p/terrastore/.
Office Action from Chinese Patent Application No. 201410599318.6, dated Aug. 17, 2018.

\* cited by examiner

METHOD OF INDEX RECOMMENDATION FOR NOSQL DATABASE

BACKGROUND

The present invention relates to database management, and more specifically, to a method and apparatus for indexing a document database.

With the emergence of Internet Web 2.0, the NoSQL non-relational database has become an extremely popular new field. When facing demand for highly concurrent read and write of a database, demand for highly efficient storage and access of mass data, and demand for high scalability and high availability of a database, a relational database has become powerless. Compared with a relational database, a NoSQL database has flexible scalability, and there are various types of NoSQL databases, however, a common feature thereof is that relational characteristics of the relational database have been removed. There is no relationship between data, so it is very easy to be extended, which brings scalability at the architectural level. A document database is a very important branch in non-relational databases, and it is mainly used for storing, indexing and managing document-oriented data or similar semi-structured data. As the name suggests, a critical core concept of the document database (document-oriented database) is document, which is the smallest unit in the database. MongoDB is currently the most popular NoSQL database, which is a set-oriented, model-independent document database, wherein data are grouped by "set", each set has a unique name and may contain an unlimited number of documents. Here, the set is similar to a table in a relational database, the only difference is that it does not have any explicit schema.

Creating a database index is an important aspect in database management, the database index is a data structure for sorting one or more columns of values in a database table, the data structure refers to (points to) data in some way, to assist in rapid querying and updating of data in the database table. A relational database is usually stored in table structure, and establishment of an index may simply be only directed to some fixed fields. Whereas a document database usually does not define field structure, and during the process in which a document database is being used, there is constantly new document introducing new field structure, so pre-selecting some fixed fields cannot effectively deal with dynamic change in document fields of the document database. In addition, due to greater difficulty in data chunking, indexing a relational database is directed to all the data in a table. When data amount is huge, especially when all the data in a non-relational database document providing online services are being indexed, performance of accessing the database during indexing becomes very poor.

Accordingly, a method for effectively indexing a document database is needed.

BRIEF SUMMARY

According to one embodiment, there is provided a method for indexing a document database, the method including determining, according to user's access status on a plurality of documents in the document database, index indicators from attributes of respective fields of the plurality of documents. The index indicators are used for indexing the plurality of documents. The method also includes dividing the plurality of documents into a plurality of document sets and indexing the plurality of document sets according to the index indicators.

According to another embodiment, there is provided an apparatus for indexing a document database, the apparatus including a first determining module configured to determine, according to user's access status on a plurality of documents in the document database, index indicators from attributes of respective fields of the plurality of documents. The index indicators are used for indexing the plurality of documents. The apparatus also includes a dividing module configured to divide the plurality of documents into a plurality of document sets, and an indexing module configured to index the plurality of document sets according to the index indicators.

The method and apparatus according to embodiments divide a plurality of documents in a document database into document sets by utilizing the feature that a document database is easy to be divided into chunks. Therefore, the method and apparatus may effectively implement indexing of the document database for the document sets.

Other aspects and embodiments of the present invention will become apparent from the following detailed description, which, when taken in conjunction with the drawings, illustrate by way of example the principles of the invention.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Figure 1:
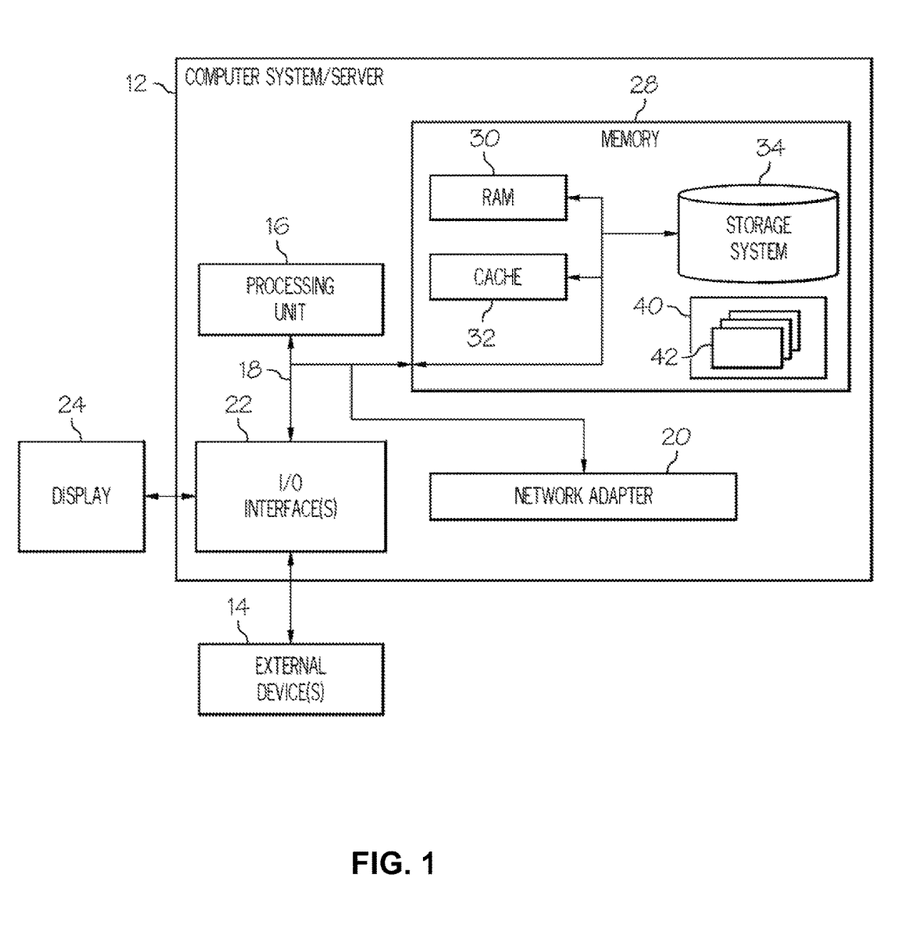
FIG. 1 shows a block diagram of an exemplary computer system/server which is applicable to implement the embodiments of the present invention.

Referring now to FIG. 1, in which a block diagram of an exemplary computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
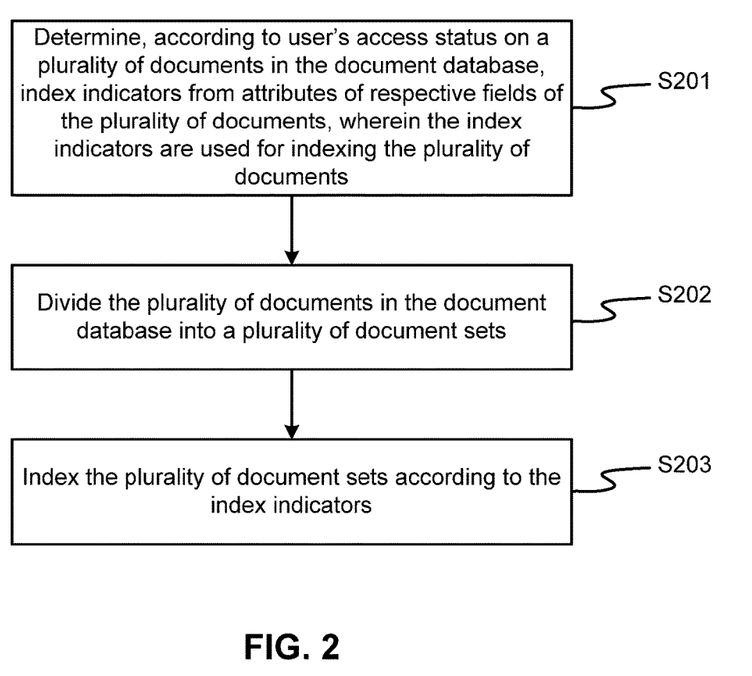
FIG. 2 shows a method for indexing a document database according to an embodiment.

FIG. 2 shows a method for indexing a document database according to an embodiment, the method comprising: in step S201, determining, according to user's access status on a plurality of documents in the document database, index indicators from attributes of respective fields of the plurality of documents, wherein the index indicators are used for indexing the plurality of documents; in step S202, dividing the plurality of documents into a plurality of document sets; in step S203, indexing the plurality of document sets according to the index indicators.

In step S201, index indicators are determined from attributes of respective fields of the plurality of documents according to user's access status on a plurality of documents in the document database, wherein the index indicators are used for indexing the plurality of documents, specifically, it comprises: the user's operation on the respective fields of the plurality of documents are recorded within a period of time, wherein the operation includes at least one of the following: query operation, write operation, and grouping/sorting operation; statistics are collected about the attributes of the respective fields of the plurality of documents in the document database and statistics are collected about a number of times of a same operation for each attribute, wherein, in response to an attribute of a field b in the respective fields including sub-attributes, the number of times of the same operation for each attribute is the sum of the numbers of times of the same operation for all the sub-attributes of the attribute of the field b; the index indicators are determined from the attributes according to number of times of a same operation for each attribute.

Figure 3:
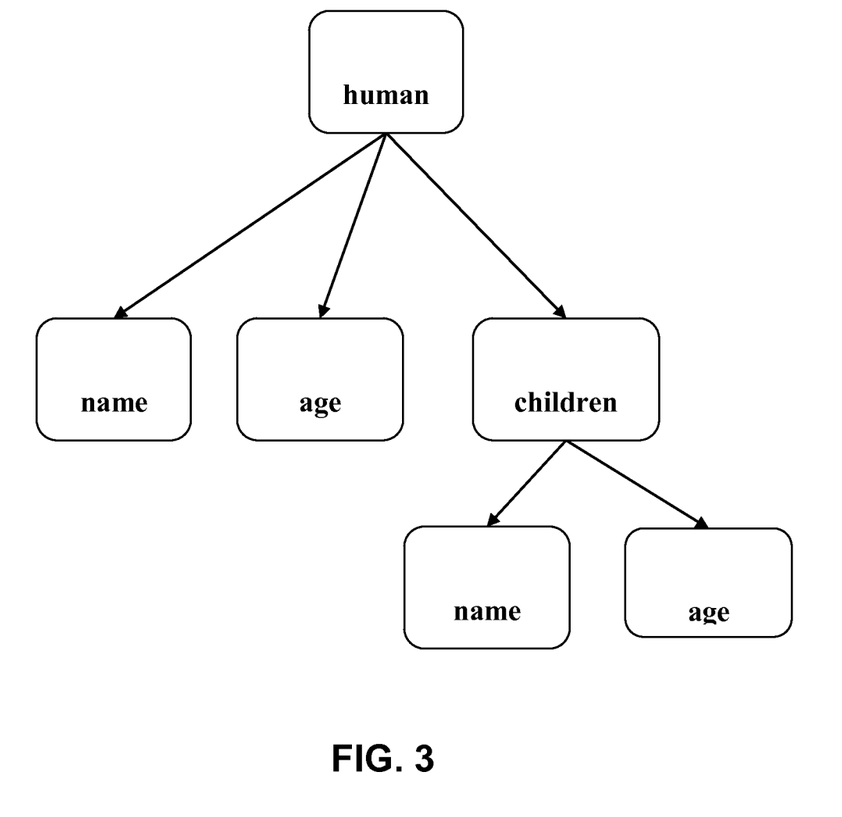
FIG. 3 shows a tree structure of attributes of documents 1, 2 and 3 according to one embodiment.
Figure 4:
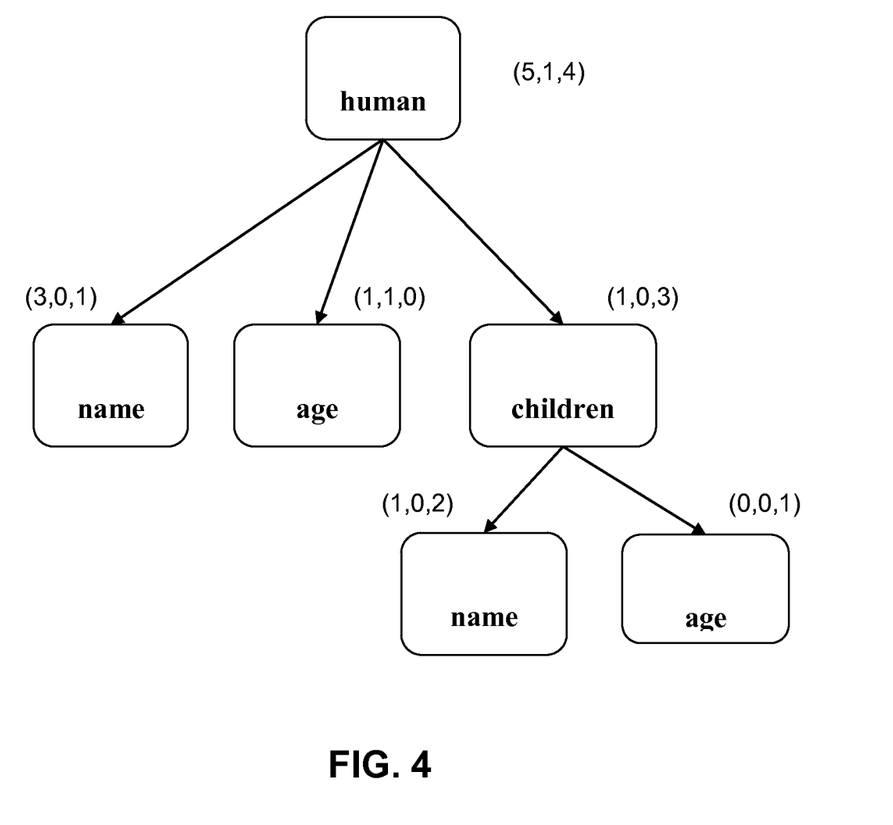
FIG. 4 shows number of times of a same type of operation for each attribute identified on the tree structure of the attributes of FIG. 3.

According to an embodiment, there is shown determination of index indicators according to access status on 3 documents in the document database, and Tables 1, 2 and 3 show the three documents in the document database. FIG. 3 shows a tree structure of attributes of documents 1, 2 and 3 according to an embodiment, wherein an attribute human includes three sub-attributes, i.e., name, age and children, wherein the attribute children further includes sub-attributes, i.e., name and age. Table 4 records attributes of and operations on the documents 1, 2 and 3, Table 5 collects statistics about attributes of the documents 1, 2 and 3 and number of times of a same operation for each attribute, and FIG. 4 shows a number of times of a same operation for each attribute identified on the tree structure of the attributes of FIG. 3.

TABLE 1

| Document 1 | | |
|---|---|---|
| Serial No. | Attribute of field | Value of field |
| 1 | human | — |
| 2 | human/name | Bill |
| 3 | human/age | 28 |
| 4 | human/children | — |
| 5 | human/children/name | Andy |
| 6 | human/children/age | 3 |

TABLE 2

Document 2

| Serial No. | Attribute of field | Value of field |
|---|---|---|
| 1 | human | — |
| 2 | human/name | Jim |
| 3 | human/age | 25 |
| 4 | human/children | — |
| 5 | human/children/name | Tommy |
| 6 | human/children/age | 1 |

| Serial No. | Attribute of field | Value of field |
|---|---|---|
| 1 | human | — |
| 2 | human/name | Kate |
| 3 | human/age | 26 |
| 4 | human/children | — |
| 5 | human/children/name | Jack |
| 6 | human/children/age | 2 |

TABLE 4

Recorded attributes of and operations on Documents 1, 2 and 3

| Serial No. | Attribute of field | Value of field | Type of access |
|---|---|---|---|
| 1 | human/name | Bill | query operation |
| 2 | human/name | Jim | query operation |
| 3 | human/age | 28 | write operation |
| 4 | human/children/name | Tommy | grouping, sorting operation |
| 5 | human/children/age | 25 | grouping, sorting operation |
| 6 | human/children/name | Andy | grouping, sorting operation |
| 7 | human/age | 2 | query operation |
| 8 | human/name | Kate | query operation |
| 9 | human/name | Bill | grouping, sorting operation |
| 10 | human/children/name | Jack | query operation |

TABLE 5

Collected statistics about attributes of documents 1, 2 and 3 and the number of times of a same type of operation for each attribute

| Attribute of field | Number of times of query operation | Number of times of write operation | Number of times of grouping/sorting operation |
|---|---|---|---|
| human | 5 | 1 | 4 |
| human/children | 1 | 0 | 3 |
| human/name | 3 | 0 | 1 |
| human/age | 1 | 1 | 0 |
| human/children/name | 1 | 0 | 2 |
| human/children/age | 0 | 0 | 1 |

According to an embodiment, the index indicators may be determined according to a Top-N pattern, and the query operation, the write operation and the grouping/sorting operation are respectively assigned weights $\alpha_1$, $\alpha_2$ and $\alpha_3$, number of times of operation of the query operation, the write operation and the grouping/sorting operation for the 6 attributes in Table 5 are weighted, and weighted values ($W_1$, $W_2$, $W_3$, $W_4$, $W_5$, $W_6$) of sum of number of times of the three types of operations for each attribute of the 6 attributes are calculated.

$$W_1 = 5\alpha_1 + \alpha_2 + 4\alpha_3 \quad (1)$$

$$W_2 = \alpha_1 + 3\alpha_3 \quad (2)$$

$$W_3 = 3\alpha_1 + \alpha_3 \quad (3)$$

$$W_4 = \alpha_1 + \alpha_2 \quad (4)$$

$$W_5 = \alpha_1 + 2\alpha_3 \quad (5)$$

$$W_6 = \alpha_3 \quad (6)$$

The ($W_1$, $W_2$, $W_3$, $W_4$, $W_5$, $W_6$) are sorted in a descending order, and N attributes corresponding to the first N weighted values are selected as the index indicators, wherein N may be specified by an administrator of the non-relational database.

According to another embodiment, the index indicators may be determined according to a threshold pattern; an administrator of the non-relational database sets a threshold T based on experience, selects weighted values that exceed the threshold T from ($W_1$, $W_2$, $W_3$, $W_4$, $W_5$, $W_6$), and takes the attributes corresponding to the weighted values that exceed the threshold T as the index indicators.

Since number and type of documents in a document database change constantly, at every period of time, according to the recorded user's operation on the respective fields of the documents in the document database within a period of time, statistics about attributes of the fields of the documents are collected and updated, from which the index indicators that need to be indexed are filtered out, so as to realize dynamic update of the index indicators.

In step S202, the plurality of documents in the document database are divided into document sets. In prior art, all documents are indexed, which takes a long time to index, takes up memory and disk space, and affects performance of the database system. According to an embodiment, a plurality of documents may be divided into document sets, each document set is formed by at least one document, and the document sets are indexed. For example, the plurality of documents may be divided into document sets randomly, or the plurality of documents may be divided into document sets according to user's access time and access frequency, as long as it is ensured that number of the document sets is greater than or equal to number of the index indicators. According to an embodiment, the number of the document sets is an integer multiple of the number of the index indicators, which is easy to implement an algorithm for indexing the document sets, has short indexing time, and takes up small memory and disk space.

Those skilled in the art will appreciate that, step S201 and step S202 may either be performed concurrently or be executed successively, and there is no limitation as to the order of implementation.

In step S203, documents in the document sets are indexed according to the index indicators, specifically, it comprises: selecting document sets according to number of the index indicators; allocating an index indicator to each document set and performing indexing according to the allocated index indicator; in response to determining that there is a document set that has been indexed, obtaining an index indicator a allocated to the document set that has been indexed; in response to determining that there are document sets to which index indicators are not allocated, selecting a document set to which an index indicator is not allocated, and performing indexing according to the index indicator a; in response to determining that there is no document set to which an index indicator is not allocated, judging whether each of the plurality of document sets has been indexed according to all the index indicators; in response to the judgment result being NO, a document set is selected to which index indicator a is not allocated, and indexing is performed according to the index indicator a.

The embodiment may further comprise: obtaining a newly added index indicator; in response to determining that there are document sets to which index indicators are not allocated, selecting a document set to which an index indicator is not allocated, and performing indexing according to the newly added index indicator; in response to determining that there is no document set to which an index indicator is not allocated, judging whether each of the plurality of document sets has been indexed according to all the index indicators; in response to the judgment result being NO, collecting statistics about number of allocated index indicators for each document set; allocating the newly added index indicator to a document set to which least number of index indicators are allocated, and performing indexing according to the newly added index indicator.

The embodiment may further comprise: obtaining a discarded index indicator; in response to determining that there is a document set that has been indexed according to the discarded index indicator, deleting indexes established according to the discarded index indicator and deleting the discarded index indicator.

Figure 5:
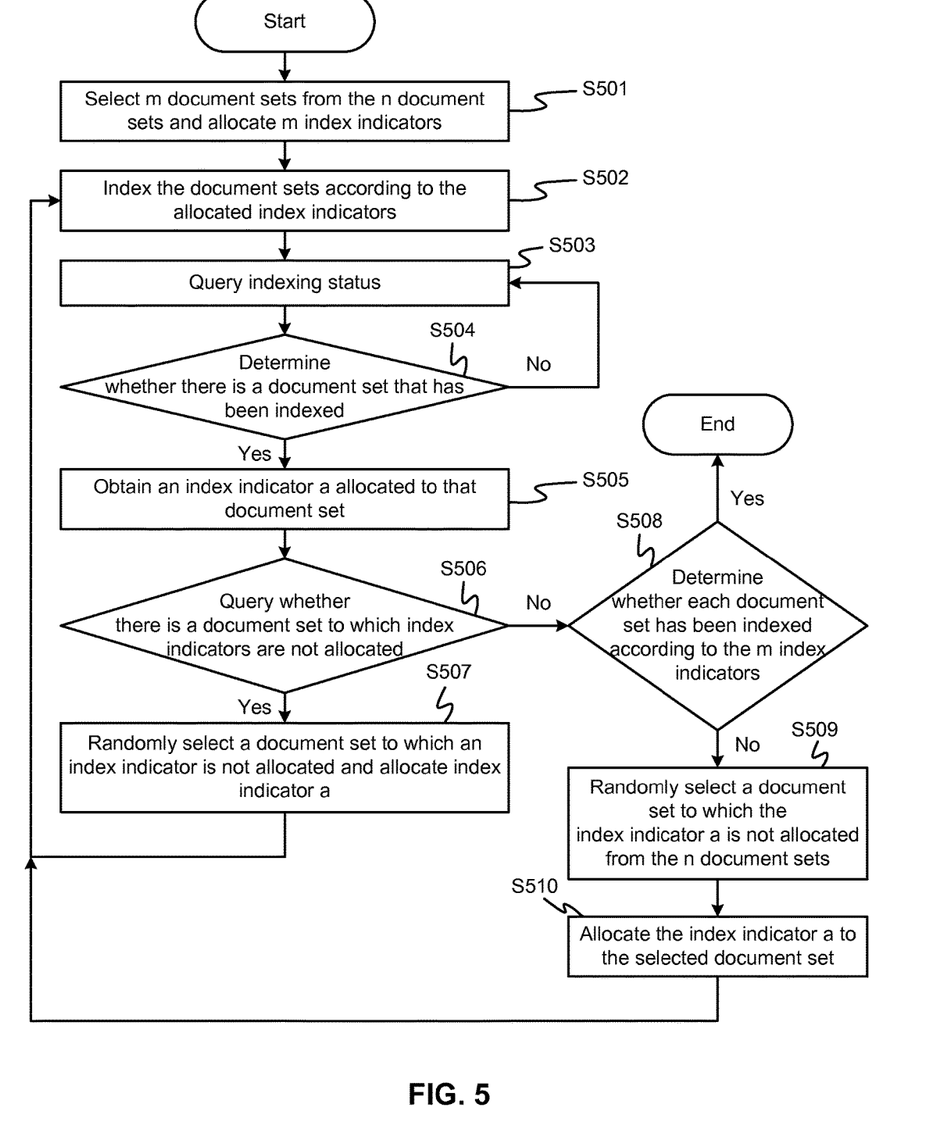
FIG. 5 shows a flow for indexing documents in the document sets according to the index indicators according to an embodiment.

FIG. 5 shows a flow for indexing documents in document sets according to the index indicators according to an embodiment. Firstly, m index indicators are determined according to the above step S201 and step S202 in FIG. 2, and documents in the document database are divided into n document sets (n>m); in step S501 of FIG. 5, m document sets are selected from the n document sets and m index indicators are allocated to the m document sets; in step S502, the document sets are indexed according to the allocated index indicators; in step S503, an indexing status of each document is queried; in step S504, whether there is a document set that has been indexed is judged; in response to this query result being NO, the flow returns to step S503 to continue querying; in response to this query result being YES, in step S505, an index indicator "a" allocated to that document set is obtained; in step S506, whether there is a document set to which index indicators are not allocated in the n document sets is queried; in response to this query result being YES, in step S507, a document set to which an index indicator is not allocated is randomly selected and an index indicator is allocated thereto, and the flow returns to step S502 to index according to the allocated index indicator; in response to this query result being NO, in step S508, whether each document set has been indexed according to the m index indicators is judged; in response to this query result being YES, the flow ends; in response to this query result being NO, in step S509, a document set to which the index indicator "a" is not allocated is randomly selected; in step S510, the index indicator "a" is allocated to the selected document set, and the flow returns to step S502 to index according to the allocated index indicator.

Figure 6:
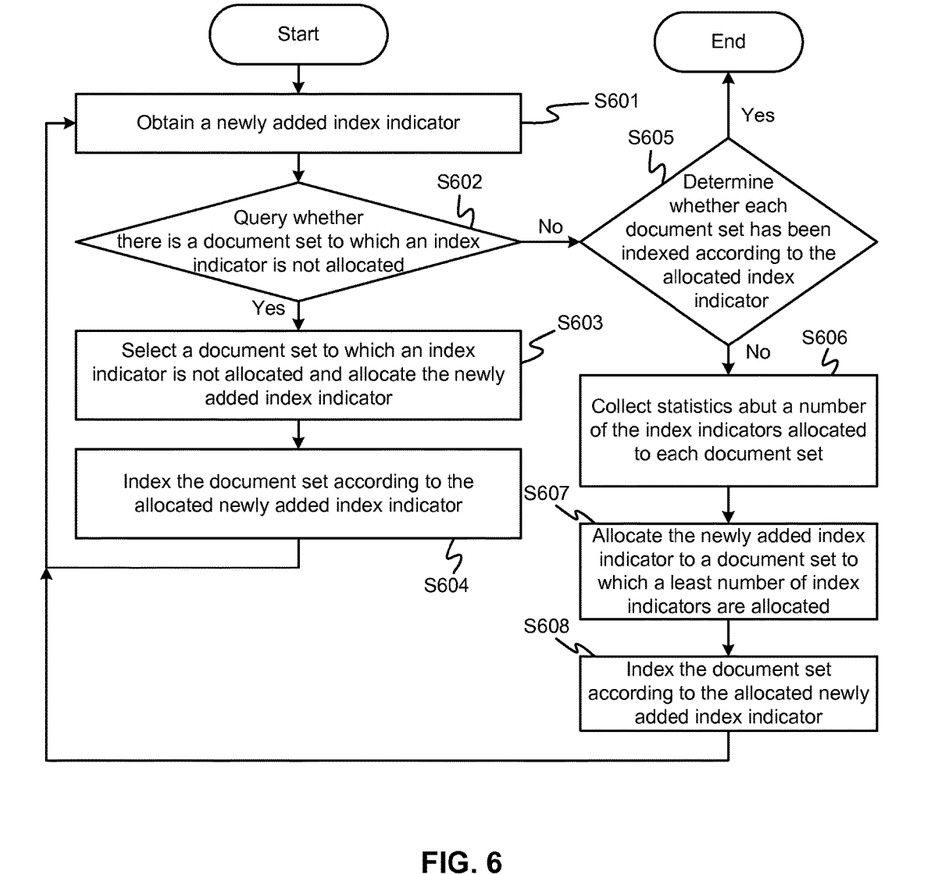
FIG. 6 shows a flow for indexing according to a newly added index indicator according to the flow of FIG. 5.

FIG. 6 shows a flow for indexing according to a newly added index indicator according to the flow of FIG. 5, in step S601, a newly added index indicator is obtained; in step S602, whether there is a document set to which an index indicator is not allocated is queried; in response to that the query result being YES, in step S603, a document set to which an index indicator is not allocated is selected and the newly added index indicator is allocated; in step S604, the selected document set is indexed according to the allocated newly added index indicator, and the flow returns to step S601; in response to that the query result being NO, in step S605, whether each document set has been indexed according to the allocated index indicator is judged; in response to that the query result being YES, the flow ends; in response to that the query result being NO, in step S606, statistics about number of the index indicators allocated to each document set are collected; in step S607, the newly added index indicator is allocated to a document set to which least number of index indicators are allocated; in step S607, the document set is indexed according to the allocated newly added index indicator, and the flow returns to step S601.

Due to greater difficulty in data chunking, indexing a relational database is directed to all the data in a table. In embodiments described herein, rather than indexing all the documents in a document database according to all the index indicators at one time, a plurality of documents in the document database are divided into document sets, and the document sets are indexed step by step according to all the index indicators, thus, by utilizing characteristics that a document database is easy to be chunked, influence on performance of a database system during the indexing process may be reduced. By manner of performing indexing step by step according to chunks, the indexing process dynamically changes with index indicators, for example, a newly added index indicator is generated and an index indicator is discarded, an index established according to the discarded index indicator is deemed as an invalid index, and establishment of an invalid index may be deemed as performance loss, thus, performance loss resulted from indexing all the documents may be avoided.

Those skilled in the art will appreciate that, there may be various implementations for indexing the divided document sets according to the allocated index indicators in the above steps S502, S604 and S608 of FIGS. 5-6, and manner of indexing is not limited to any specific indexing manner. For example, there are four indexing manners commonly used in a MySQL database: B-Tree indexing, Hash indexing, Full-text indexing and R-Tree indexing, wherein the B-Tree indexing is a type of indexing used most frequently in the MySQL database, and the B-Tree is a balanced multipath search tree, which is very useful in a document system. Definition of a B-tree is given below:

Definition of a B-tree: a m-order B-tree, or an empty tree, or a m-crossing tree satisfying the following features:

(1) There are at most m sub-trees at each node in the tree;

(2) If a root node is not a leaf node, there are at least two sub-trees;

(3) There are at least [m/2] sub-trees at all non-terminal nodes except the root node;

(4) All the non-terminal nodes contain following information data: $(n, A_0, K_1, A_1, K_2, \ldots, K_n, A_n)$ where: $K_i$ (i=1, 2, . . . , n) is a key code, and $K_i < K_{i+1}$, $A_i$ is a pointer to root node of a sub-tree (i=0, 1, . . . , n), and key codes of all the nodes in a sub-tree pointed by pointer $A_{i-1}$ are smaller than $K_i$ (i=1, 2, . . . , n), key codes of all the nodes in a sub-tree pointed by pointer $A_n$ are larger than $K_n$, n ([m/2])−1≤n≤m−1) is number of key codes;

(5) All leaf nodes appear at a same level, and do not carry information (which may be seen as external nodes or nodes failing to be found, in fact, these nodes do not exist, and pointers to these nodes are null).

B+tree is a variation of the B-tree generated as required by the document system. A m-order B+tree differs from a m-order B-tree in that:

(1) The node having n sub-trees contains n key codes;

(2) All the leaf nodes contain information of all the key codes, and pointers to records containing these key codes, and the leaf nodes per se are linked in an ascending order according to magnitude of the key codes;

(3) All the non-terminal nodes may be seen as an index part, and the nodes only contain the maximum (or minimum) key code in root node of its sub-tree.

Although the B-tree and the B+tree are introduced above, the manner of indexing is not limited thereto, both existing and future possible manners for indexing a database are within the scope of the present invention, as long as indexing of a non-relational database may be implemented.

Figure 7:
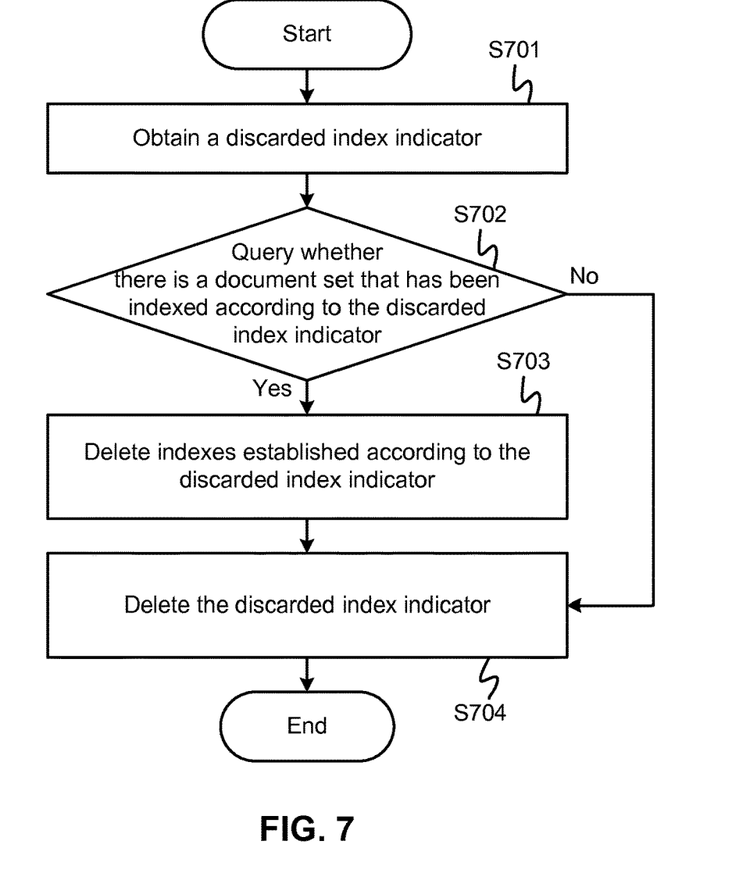
FIG. 7 shows a flow for processing a discarded index indicator according to the flow of FIG. 5.

FIG. 7 shows a flow for processing a discarded index indicator according to the flow of FIG. 5, in step S701 of FIG. 7, a discarded index indicator is obtained, the process for determining an index indicator is a dynamically updated process, and index indicators are re-determined at every period of time, if the re-determined index indicators do not comprise the index indicator determined previously, in this case, the index indicator determined previously becomes a discarded index indicator; in step S702, whether there is a document set that has been indexed according to the discarded index indicator is judged; in response to the judgment result being YES, wherein a document set for which the judgment result is YES includes two cases, one being that a document set has been indexed according to the discarded index indicator, and the other being that a document set is being indexed according to the discarded index indicator. In step S703, indexes established according to the discarded index indicator are deleted, wherein the indexes include indexes all established according to the discarded index indicator, and indexes partially established according to the discarded index indicator; in step S704, the discarded index indicator is deleted; in response to the judgment result being NO, the flow proceeds to step S704, and the flow ends.

Various embodiments for implementing the method of the present invention have been described above with reference to accompanying drawings. Those skilled in the art will appreciate that, the above method may be implemented in software, hardware, or a combination thereof. In addition, those skilled in the art will appreciate that, by implementing steps in the above method in software, hardware or a combination thereof, an apparatus for indexing a document database may be provided. Although the apparatus is the same as a general-purpose processing apparatus in hardware structure, due to function of the software contained therein, the apparatus presents a characteristic distinct from the general-purpose processing apparatus, thus forming the apparatus according to embodiments of the present invention.

Figure 8:
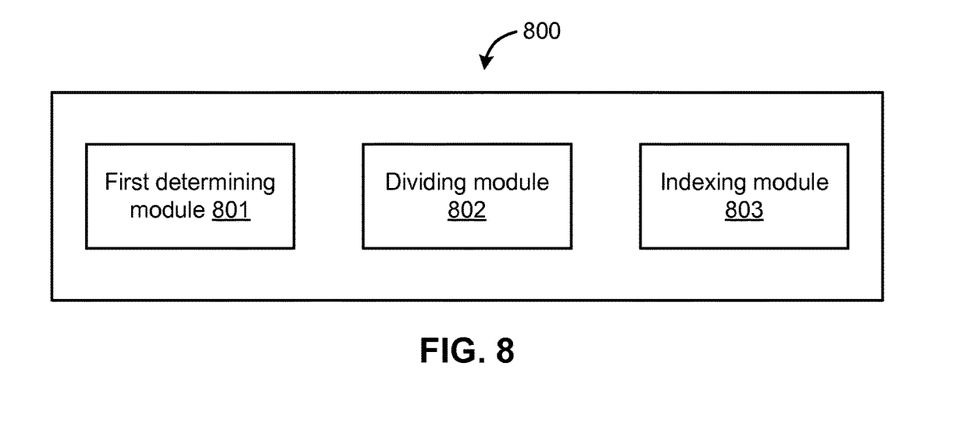
FIG. 8 shows an apparatus for indexing a document database according to an embodiment.

Based on a same inventive concept, according to an embodiment, there is also provided an apparatus for indexing a document database. FIG. 8 shows an apparatus 800 for indexing a document database according to an embodiment, the apparatus comprising: a first determining module 801 configured to determine, according to user's access status on a plurality of documents in the document database, index indicators from attributes of respective fields of the plurality of documents, wherein the index indicators are used for indexing the plurality of documents; a dividing module 802 configured to divide the plurality of documents in the document database into a plurality of document sets; and an indexing module 803 configured to index the plurality of document sets according to the index indicators.

According to an embodiment, the first determining module may further comprise: a recording module configured to record user's operation on the respective fields of the plurality of documents within a period of time; a first statistics collecting module configured to collect statistics about the attributes of the respective fields of the plurality of documents and collect statistics about number of times of a same operation for each attribute; a second determining module configured to determine the index indicators from the attributes according to number of times of a same operation for each attribute.

According to an embodiment, wherein, in response to an attribute of a field b in the respective fields including sub-attributes, the number of times of the same type of operation for each attribute is the sum of the numbers of times of the same operation for all the sub-attributes of the attribute of the field b.

According to an embodiment, a user's operation on the respective fields of the plurality of documents in the document database may include at least one of the following: query operation, write operation, and grouping/sorting operation.

According to an embodiment, a number of the plurality of document sets may be greater than or equal to number of the index indicators. According to an embodiment, the indexing module 803 may comprise: a first selecting module configured to select document sets according to the number of the index indicators; a first allocating module configured to allocate an index indicator to each selected document set and perform indexing according to the allocated index indicator; a first obtaining module configured to, in response to determining that there is a document set that has been indexed, obtain an index indicator a allocated to the document set that has been indexed; a second selecting module configured to, in response to determining that there are document sets to which index indicators are not allocated, select a document set to which an index indicator is not allocated, and perform indexing according to the index indicator a.

According to an embodiment, the indexing module 803 may further comprise: a first judging module configured to, in response to determining that there is no document set to which an index indicator is not allocated, judge whether each of the plurality of document sets has been indexed according to all the index indicators; a third selecting module configured to, in response to the judgment result being NO, select a document set to which index indicator a is not allocated, and perform indexing according to the index indicator a.

According to an embodiment, the apparatus may further comprise: a second obtaining module configured to obtain a newly added index indicator; a fourth selecting module configured to, in response to determining that there are document sets to which index indicators are not allocated, select a document set to which an index indicator is not allocated, and perform indexing according to the newly added index indicator.

According to an embodiment, the apparatus may further comprise: a second judging module configured to, in response to determining that there is no document set to which an index indicator is not allocated, judge whether each of the plurality of document sets has been indexed according to all the index indicators; a second statistics collecting module configured to, in response to the judgment result being NO, collect statistics about number of allocated index indicators for each document set; a second allocating module configured to allocate the newly added index indicator to a document set to which least number of index indicators are allocated, and perform indexing according to the newly added index indicator.

According to an embodiment, the apparatus may further comprise: a third obtaining module configured to obtain a discarded index indicator; a deleting module configured to, in response to determining that there is a document set that has been indexed according to the discarded index indicator, delete indexes established according to the discarded index indicator and delete the discarded index indicator.

For specific implementation of each of the above modules, reference may be made to the detailed description of the method for indexing a document database according to embodiments described herein, the description of which is omitted here.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for indexing a document database, comprising:
    determining, according to user's access status on a plurality of documents in the document database, index indicators from attributes of respective fields of the plurality of documents, wherein the index indicators are used for indexing the plurality of document, wherein the determining, according to user's access status on a plurality of documents in the document database, index indicators from attributes of respective fields of the plurality of documents comprises:
        recording user's operation on the respective fields of the plurality of documents within a period of time;
        collecting statistics about the attributes of the respective fields of the plurality of documents and collecting statistics about a number of times of a same operation for each attribute; and
        determining the index indicators from the attributes according to the number of times of a same type of operation for each attribute;
    dividing the plurality of documents into a plurality of document sets, wherein a number of the plurality of document sets is greater than or equal to a number of the index indicators; and
    indexing the plurality of document sets according to the index indicators after dividing the plurality of documents.

2. The method according to claim 1, wherein, in response to an attribute of a field b in the respective fields including sub-attributes, the number of times of the same operation for each attribute is a sum of the numbers of times of the same operation for all the sub-attributes of the attribute of the field b.

3. The method according to claim 1, wherein user's operation on the respective fields of the plurality of documents in the document database includes at least one of the following: query operation, write operation, and grouping/sorting operation, and wherein the determining the index indicators from the attributes according to the number of times of the same type of operation for each attribute further comprises:
    assigning a weight to each of the operations;
    multiplying the weight for each of the same type of operation for each attribute by the number of times of the same type of operation to obtain weighted values for each of the same type of operation for each attribute;
    summing the weighted values of all operations for each attribute to generate attribute weighted values;
    sorting the attributes according to corresponding attribute weighted values; and
    selecting a predetermined number of attributes that have a highest corresponding attribute weighted value.

4. The method according to claim 1, wherein the number of the plurality of document sets is a positive integer multiple of the number of the index indicators greater than one.

5. The method according to claim 1, wherein the indexing the plurality of document sets according to the index indicators comprises:
    selecting document sets according to a number of the index indicators;
    allocating an index indicator to each selected document set and performing indexing according to the allocated index indicator;
    in response to determining that there is a document set that has been indexed, obtaining an index indicator a allocated to the document set that has been indexed; and
    in response to determining that there are document sets to which index indicators are not allocated, selecting a document set to which an index indicator is not allocated, and performing indexing according to the index indicator a.

6. The method according to claim 5, wherein the indexing the plurality of document sets according to the index indicators further comprises:
    in response to determining that there is no document set to which an index indicator is not allocated, judging whether each of the plurality of document sets has been indexed according to all the index indicators; and
    in response to the judgment result being NO, selecting a document set to which index indicator a is not allocated, and performing indexing according to the index indicator a.

7. The method according to claim 5, further comprising:
    obtaining a newly added index indicator; and
    in response to determining that there are document sets to which index indicators are not allocated, selecting a document set to which an index indicator is not allocated, and performing indexing according to the newly added index indicator.

8. The method according to claim 7, further comprising:
    in response to determining that there is no document set to which an index indicator is not allocated, judging whether each of the plurality of document sets has been indexed according to all the index indicators;
    in response to the judgment result being NO, collecting statistics about a number of allocated index indicators for each document set; and
    allocating the newly added index indicator to a document set to which a least number of index indicators are allocated, and performing indexing according to the newly added index indicator.

9. The method according to claim 5, further comprising:
    obtaining a discarded index indicator; and
    in response to determining that there is a document set that has been indexed according to the discarded index indicator, deleting indexes established according to the discarded index indicator and deleting the discarded index indicator.

10. An apparatus for indexing a document database, comprising:
    at least one hardware processor configured to execute one or more modules: a first determining module configured to cause the at least one processor to determine, according to user's access status on a plurality of documents in the document database, index indicators from attributes of respective fields of the plurality of documents, wherein the index indicators are used for indexing the plurality of documents, wherein the first determining module further comprises:
- a recording module configured to cause the at least one processor to record user's operation on the respective fields of the plurality of documents within a period of time;
- a first statistics collecting module configured to cause the at least one processor to collect statistics about the attributes of the respective fields of the plurality of documents and collect statistics about a number of times of a same operation for each attribute; and
- a second determining module configured to cause the at least one processor to determine the index indicators from the attributes according to a number of times of a same type of operation for each attribute;
- a dividing module configured to cause the at least one processor to divide the plurality of documents into a plurality of document sets; and
- an indexing module configured to cause the at least one processor to index the plurality of document sets according to the index indicators after dividing the plurality of documents.

11. The apparatus according to claim 10, wherein in response to an attribute of a field b in the respective fields including sub-attributes, the number of times of the same operation for each attribute is a sum of numbers of times of the same type of operation for all the sub-attributes of the attribute of the field b.

12. The apparatus according to claim 10, wherein user's operation on the respective fields of the plurality of documents in the document database includes at least one operation selected from a group of operations comprising: query operation, write operation, and grouping/sorting operation.

13. The apparatus according to claim 10, wherein a number of the plurality of document sets is greater than or equal to a positive integer multiple greater than one of a number of the index indicators.

14. The apparatus according to claim 10, further comprising:
- a first selecting module configured to cause the at least one processor to select document sets according to number of the index indicators;
- a first allocating module configured to cause the at least one processor to allocate an index indicator to each selected document set and perform indexing according to the allocated index indicator;
- a first obtaining module configured to, in response to determining that there is a document set that has been indexed, cause the at least one processor to obtain an index indicator a allocated to the document set that has been indexed; and
- a second selecting module configured to, in response to determining that there are document sets to which index indicators are not allocated, cause the at least one processor to select a document set to which an index indicator is not allocated, and perform indexing according to the index indicator a.

15. The apparatus according to claim 14, further comprising:
- a first judging module configured to, in response to determining that there is no document set to which an index indicator is not allocated, cause the at least one processor to judge whether each of the plurality of document sets has been indexed according to all the index indicators; and
- a third selecting module configured to, in response to the judgment result being NO, cause the at least one processor to select a document set to which index indicator a is not allocated, and perform indexing according to the index indicator a.

16. The apparatus according to claim 15, further comprising:
- a second obtaining module configured to cause the at least one processor to obtain a newly added index indicator; and
- a fourth selecting module configured to, in response to determining that there are document sets to which index indicators are not allocated, cause the at least one processor to select a document set to which an index indicator is not allocated, and perform indexing according to the newly added index indicator.

17. The apparatus according to claim 16, further comprising:
- a second judging module configured to, in response to determining that there is no document set to which an index indicator is not allocated, cause the at least one processor to judge whether each of the plurality of document sets has been indexed according to all the index indicators;
- a second statistics collecting module configured to, in response to the judgment result being NO, cause the at least one processor to collect statistics about a number of allocated index indicators for each document set; and
- a second allocating module configured to cause the at least one processor to allocate the newly added index indicator to a document set to which a least number of index indicators are allocated, and perform indexing according to the newly added index indicator.

18. The apparatus according to claim 15, further comprising:
- a third obtaining module configured to cause the at least one processor to obtain a discarded index indicator; and
- a deleting module configured to, in response to determining that there is a document set that has been indexed according to the discarded index indicator, cause the at least one processor to delete indexes established according to the discarded index indicator and delete the discarded index indicator.

\* \* \* \* \*